F. W. LETSCH.
TYPOGRAPHIC MACHINE.
APPLICATION FILED MAY 22, 1916. RENEWED DEC. 28, 1920.
1,392,018.
Patented Sept. 27, 1921.
14 SHEETS—SHEET 14.
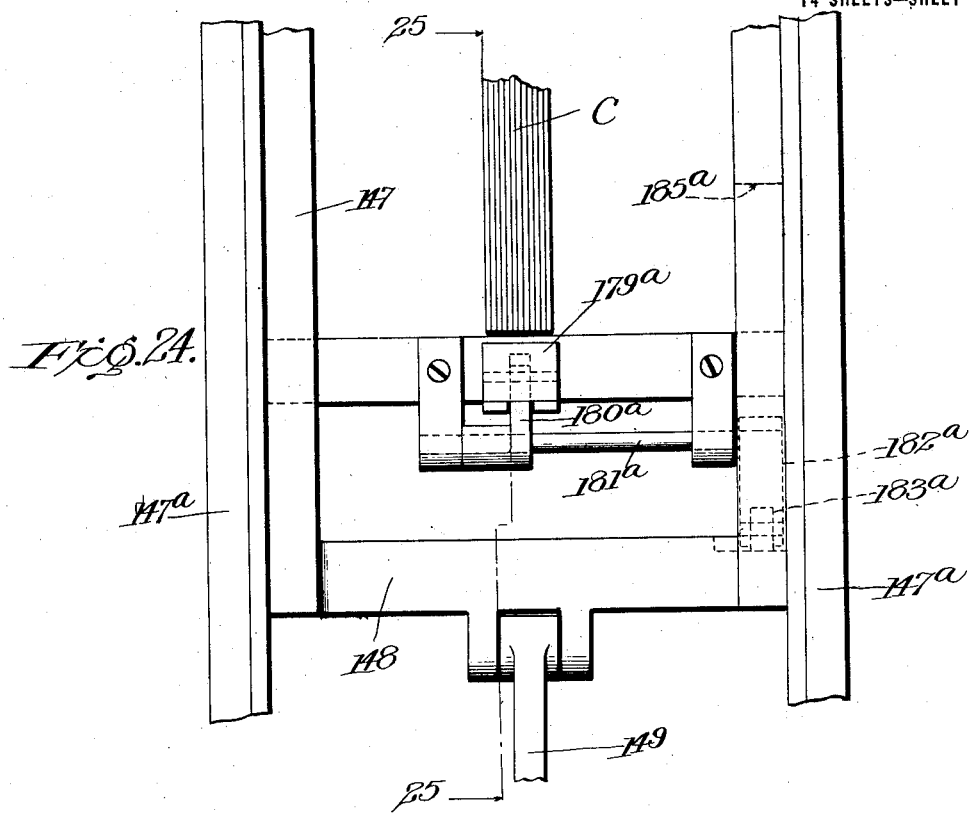
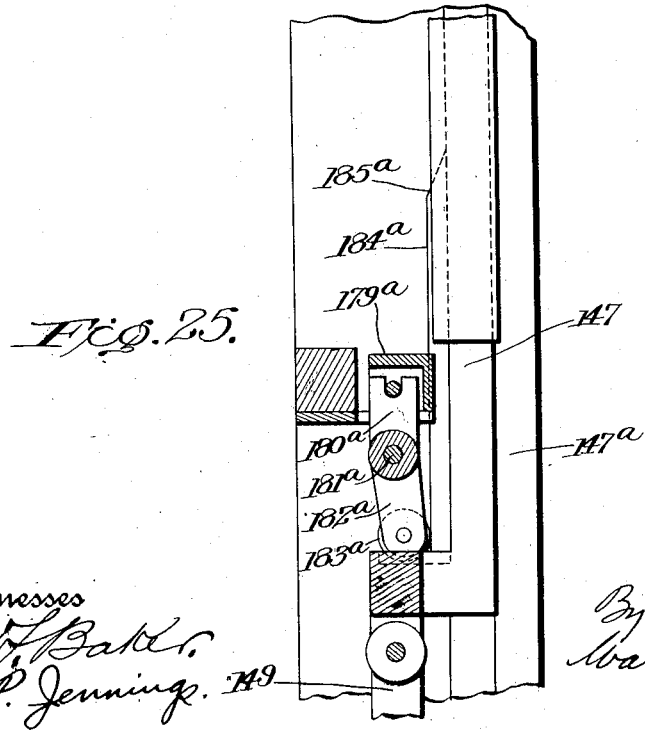

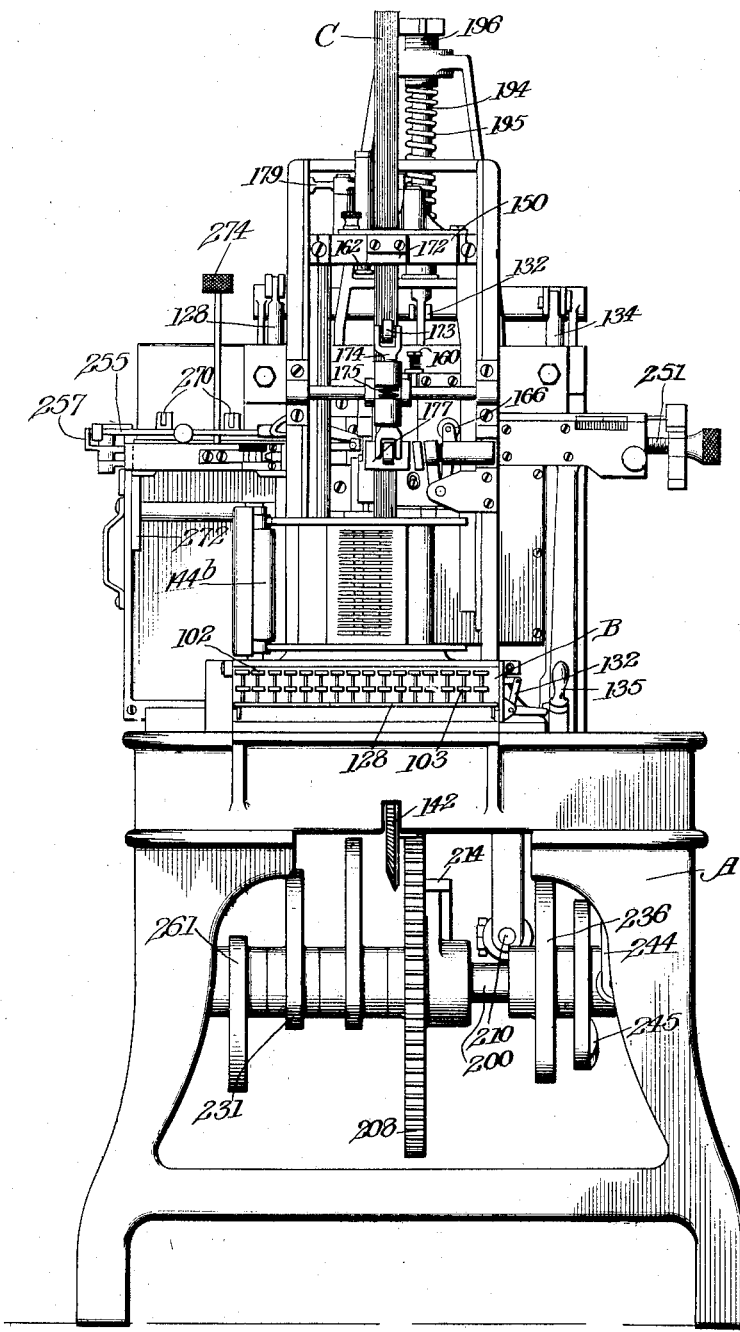

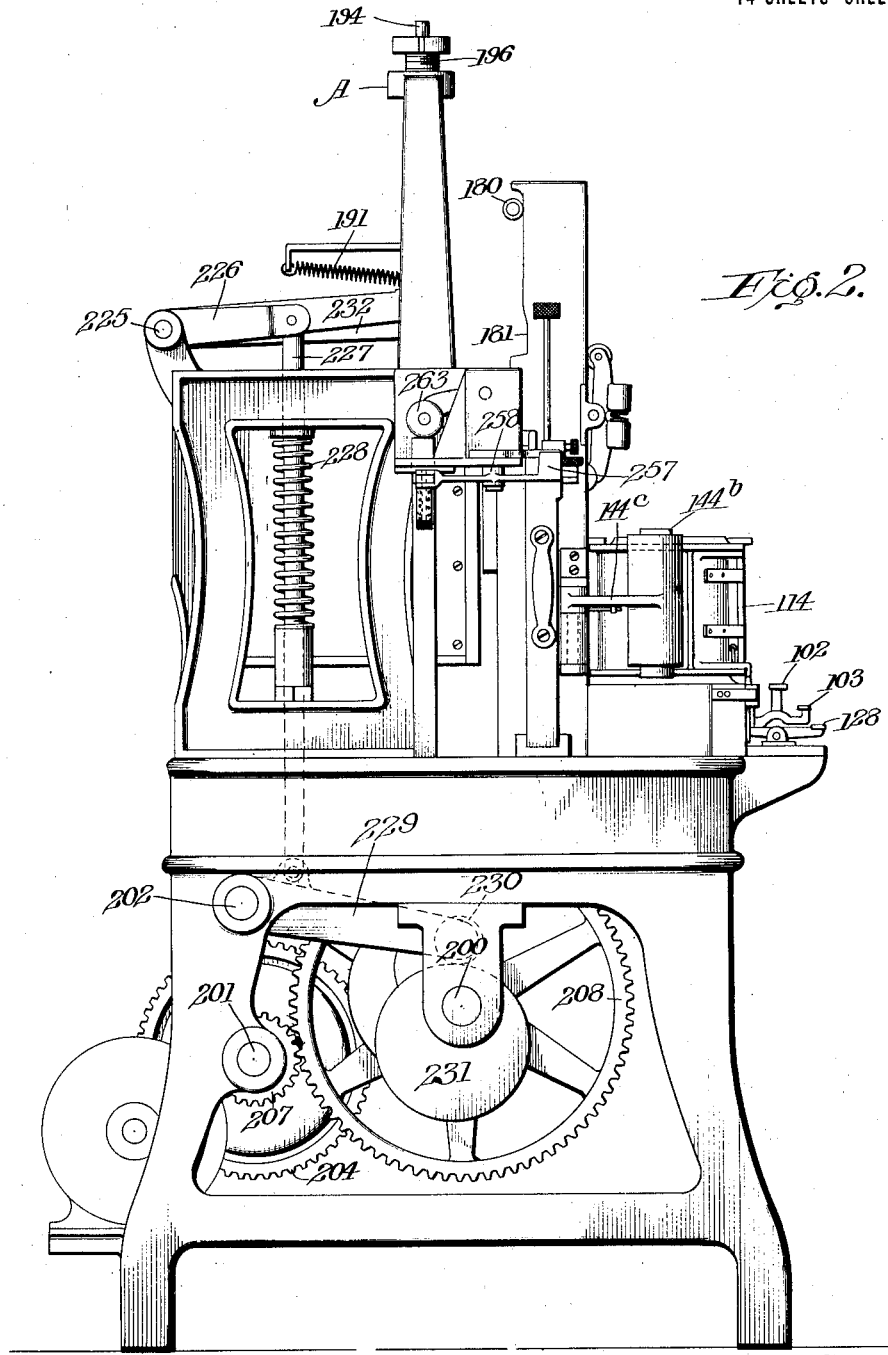

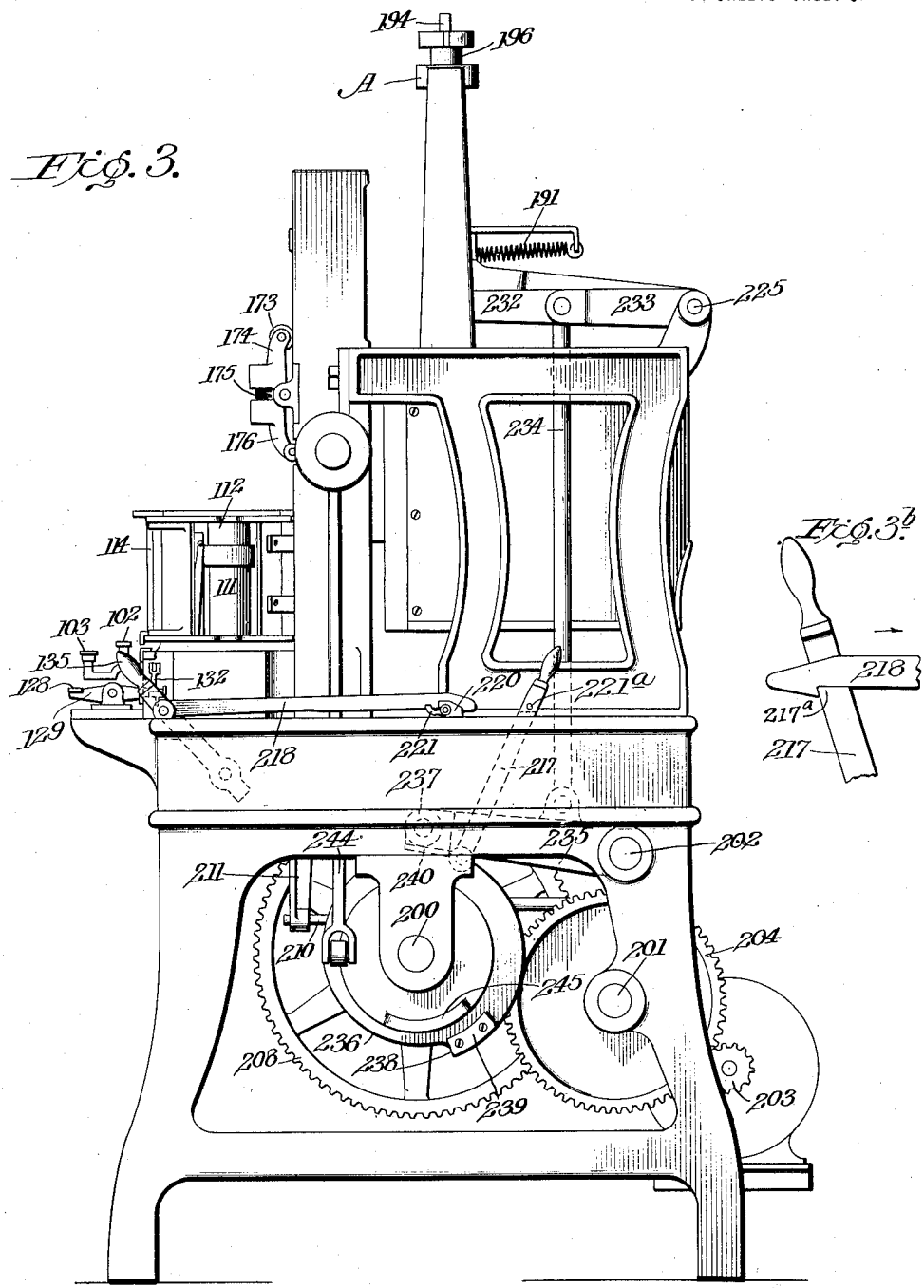

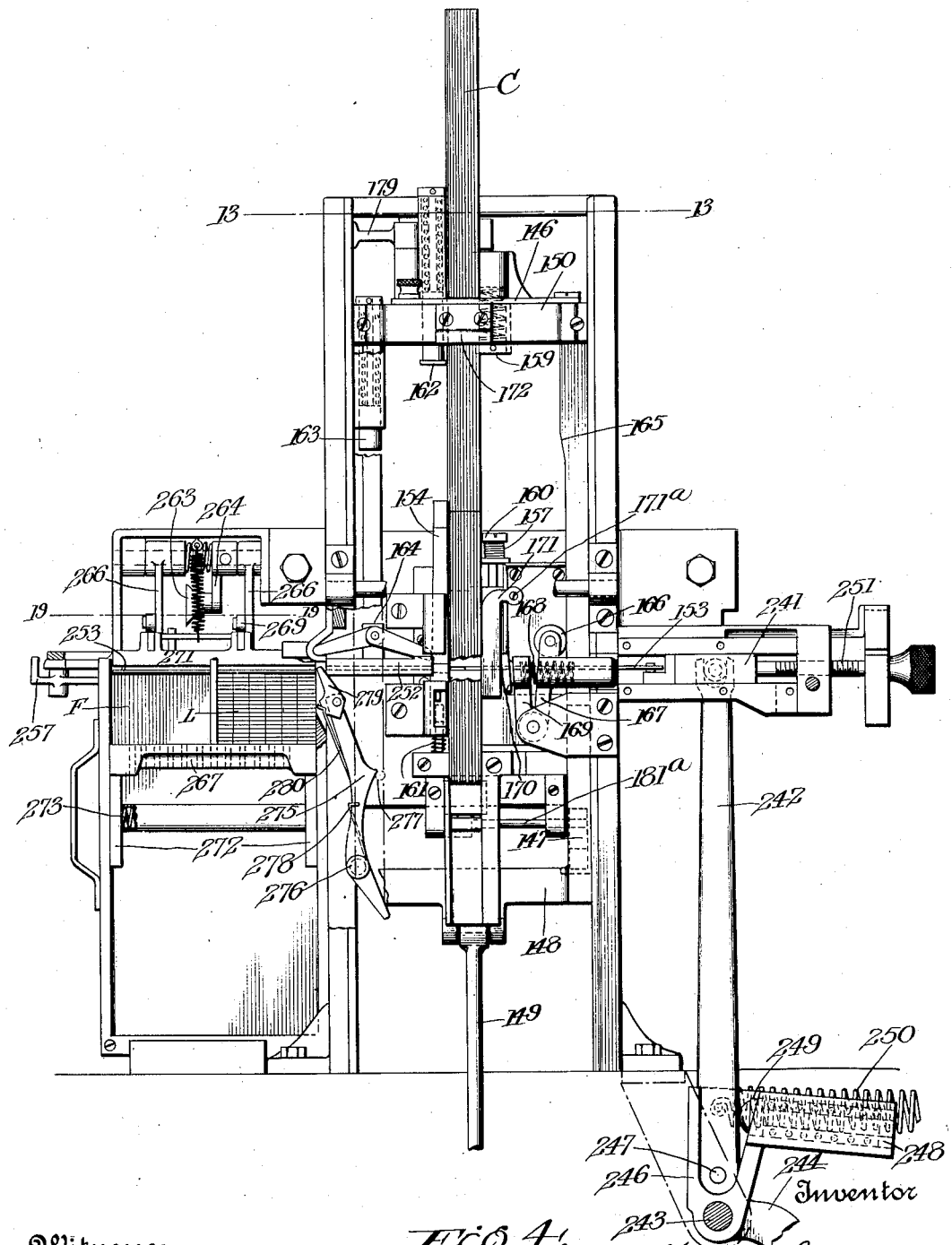

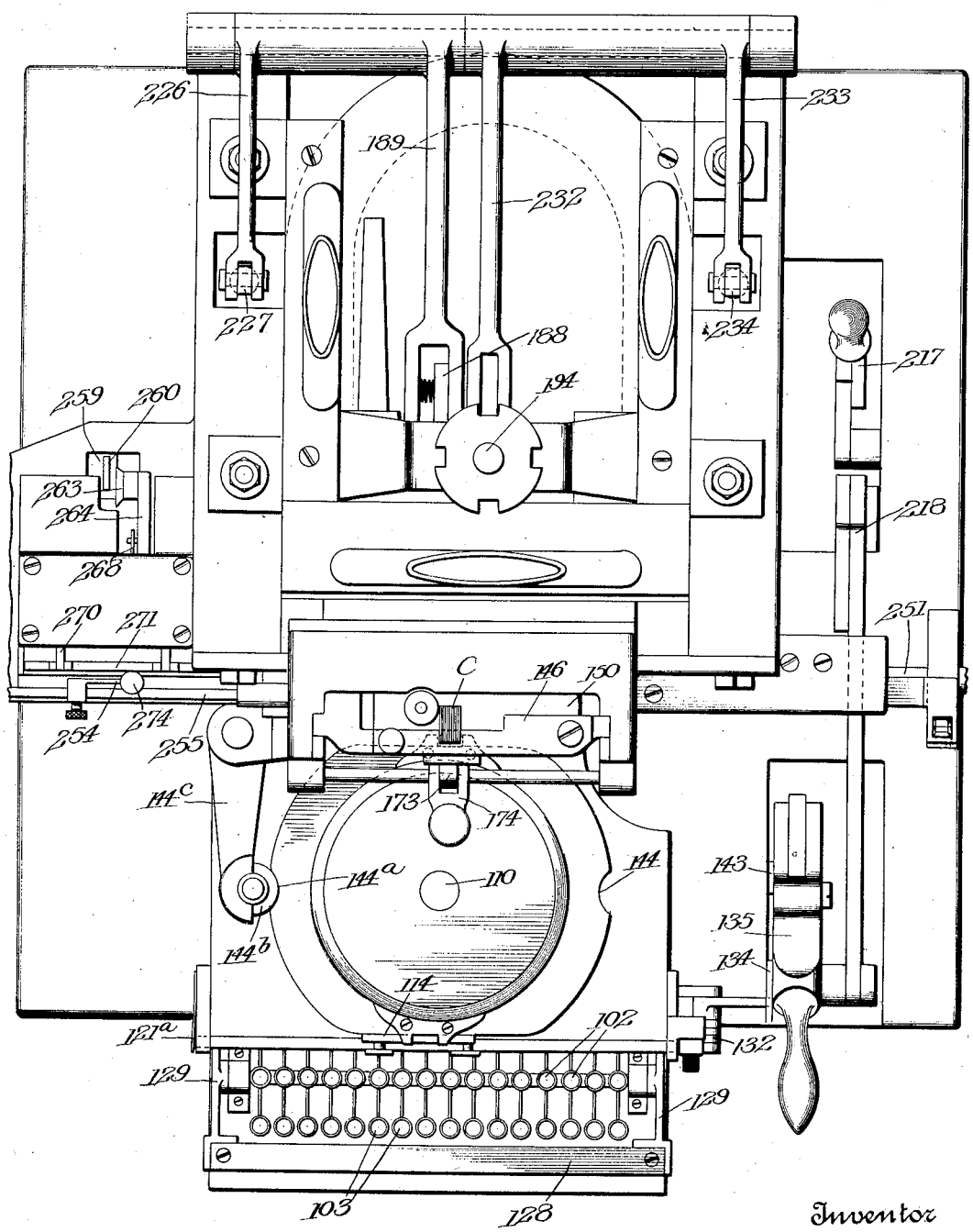

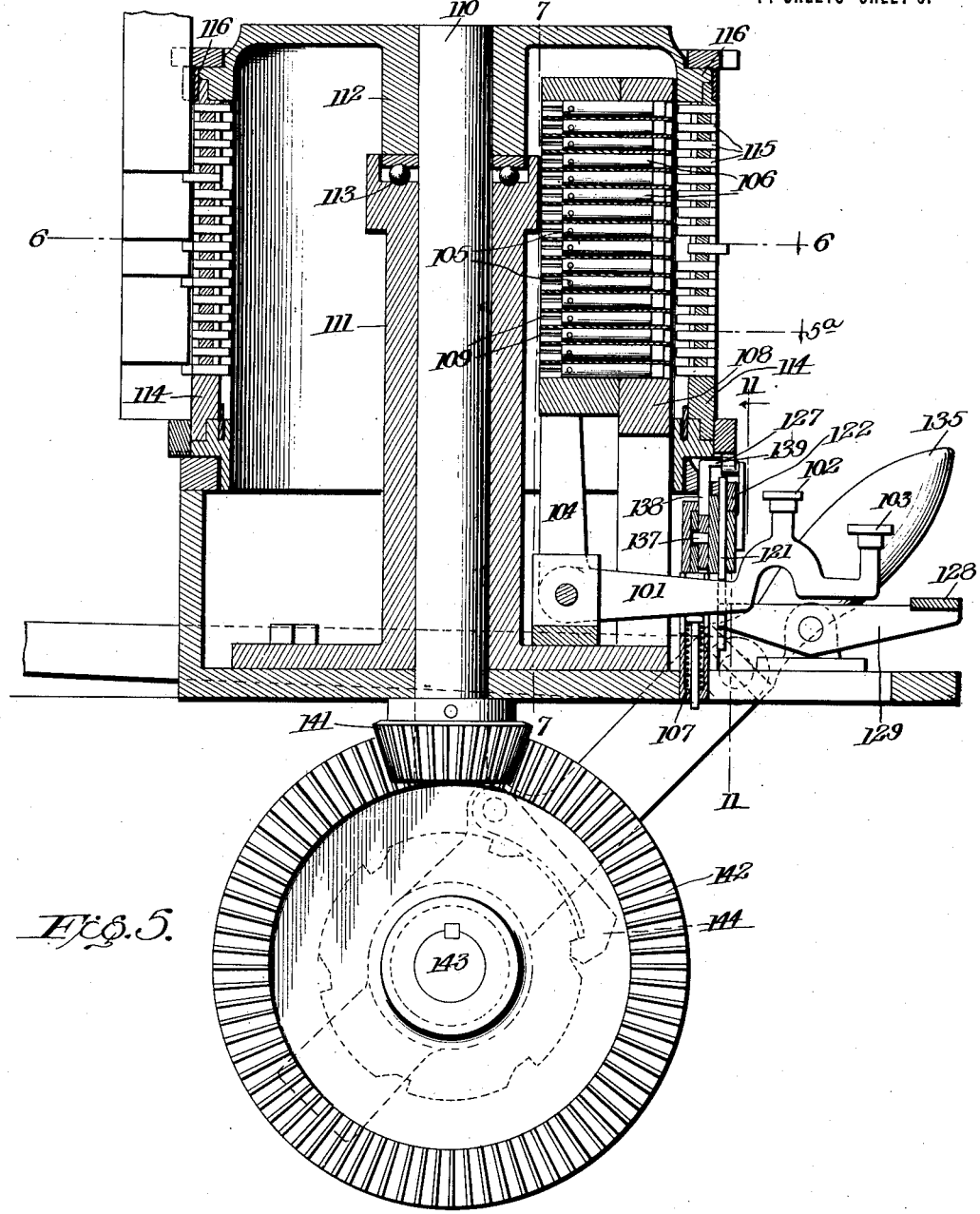
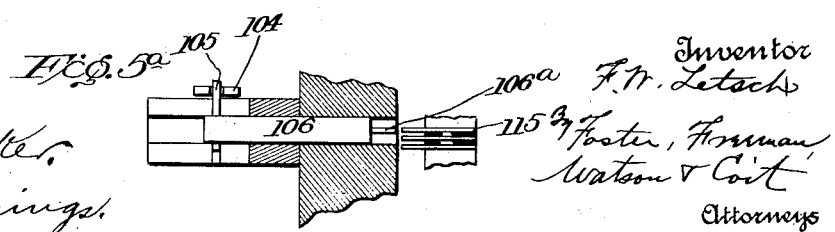

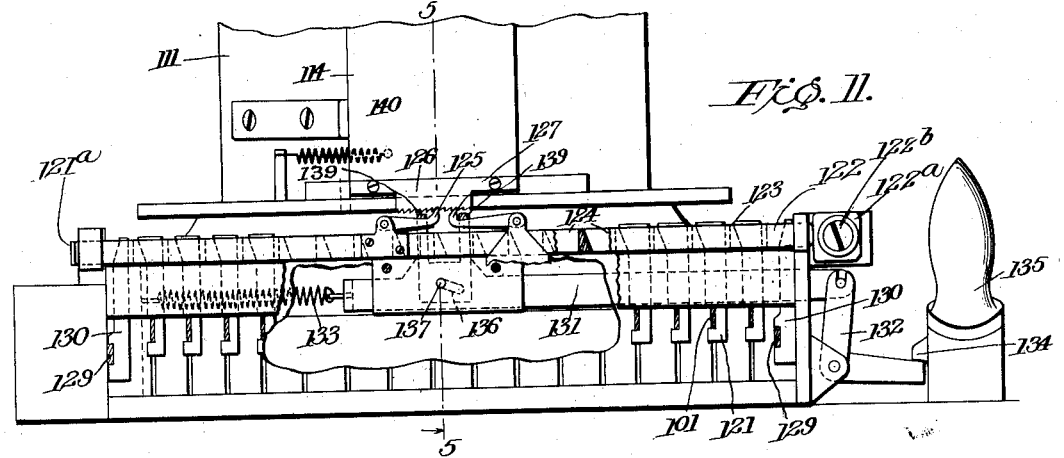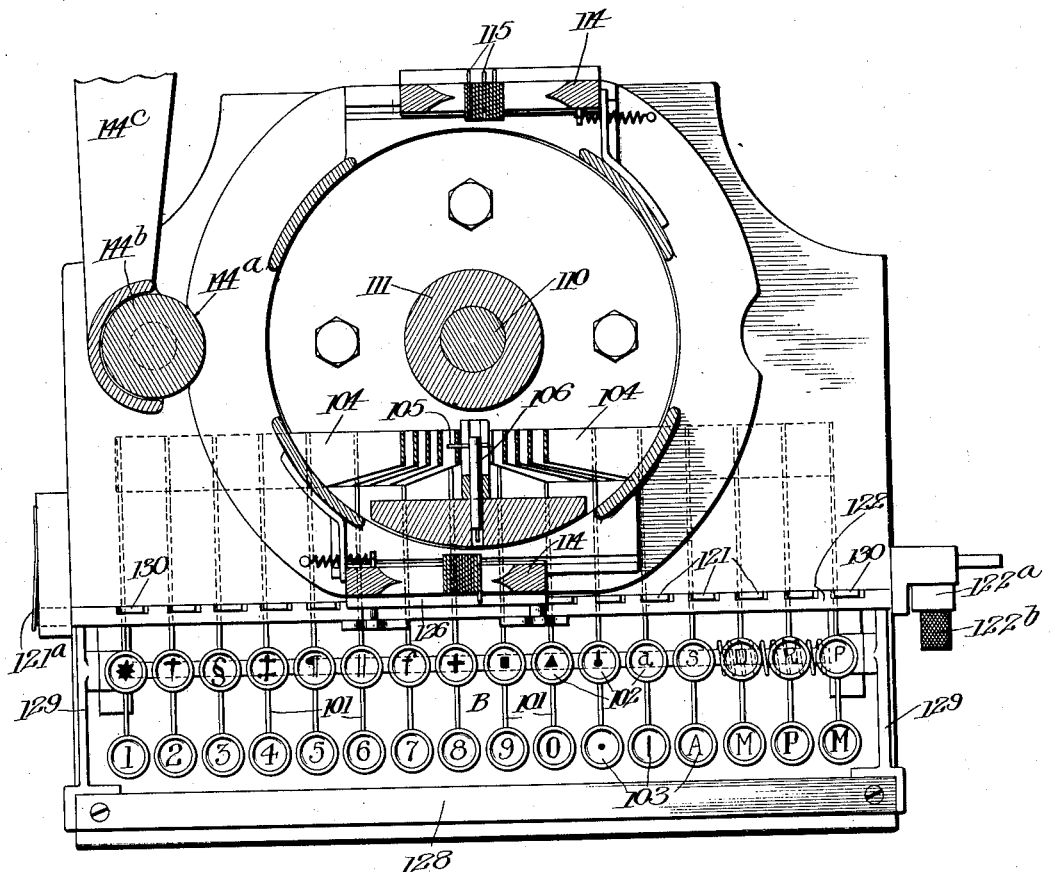

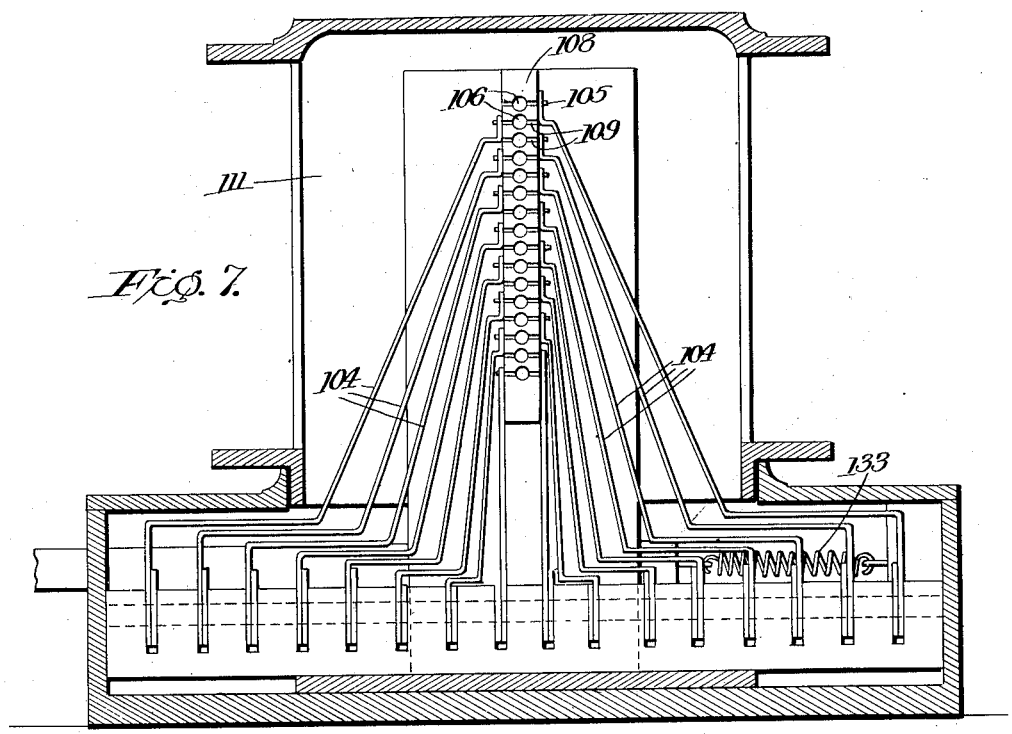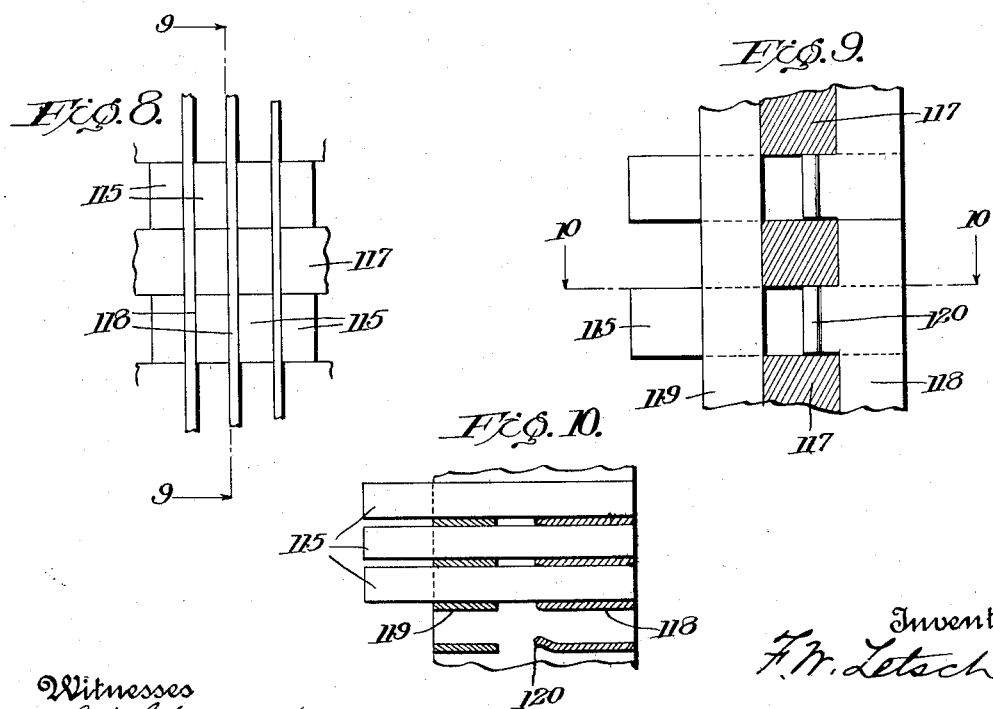

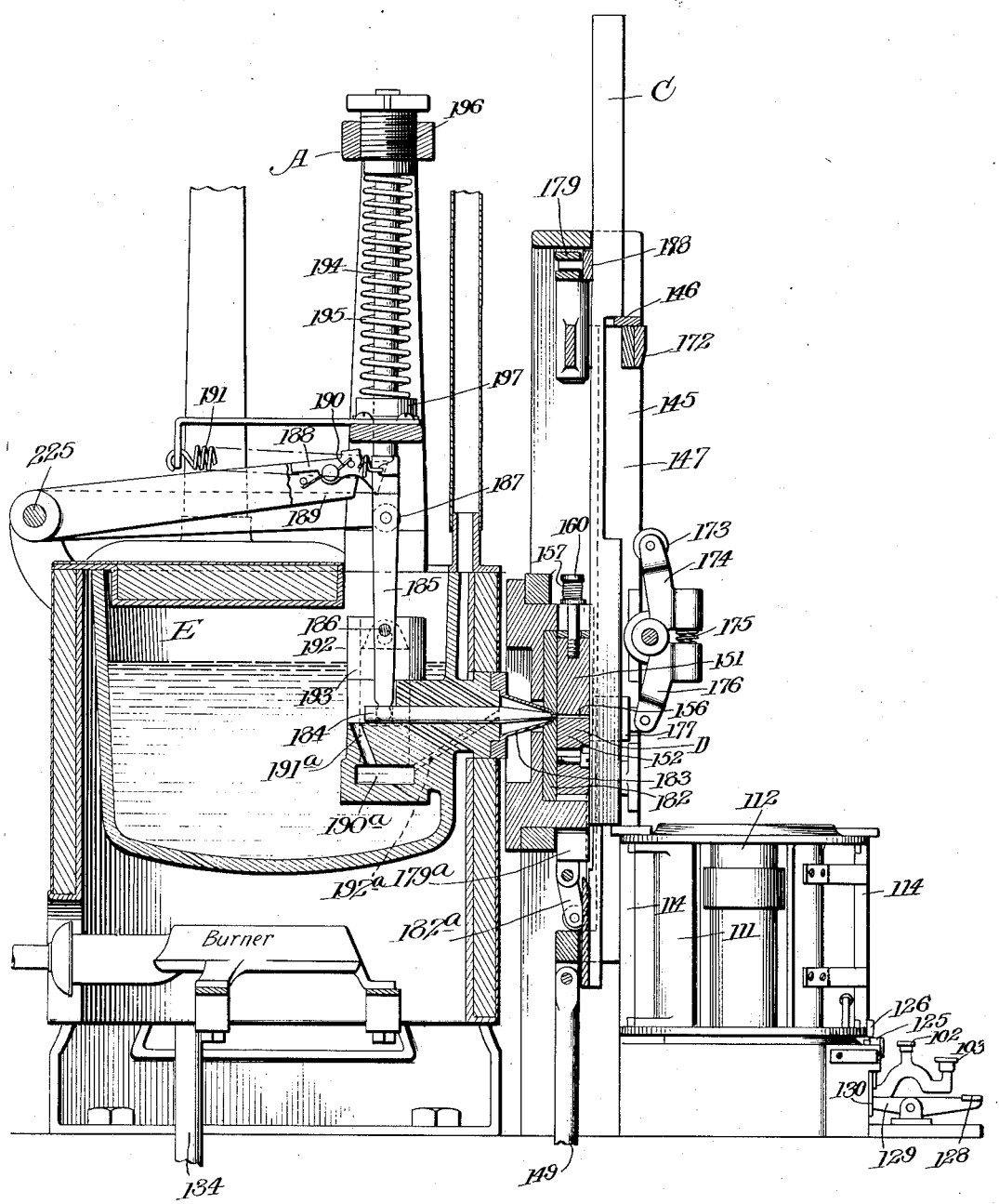

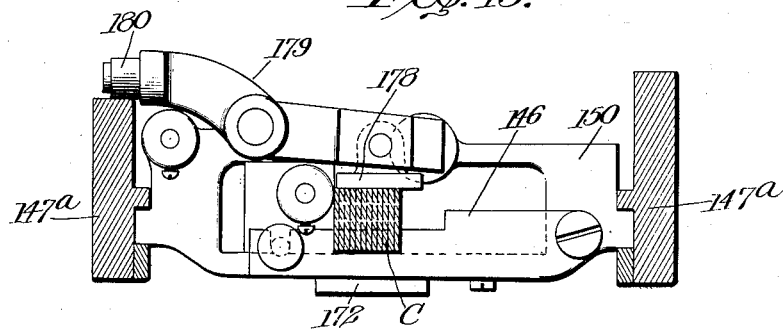
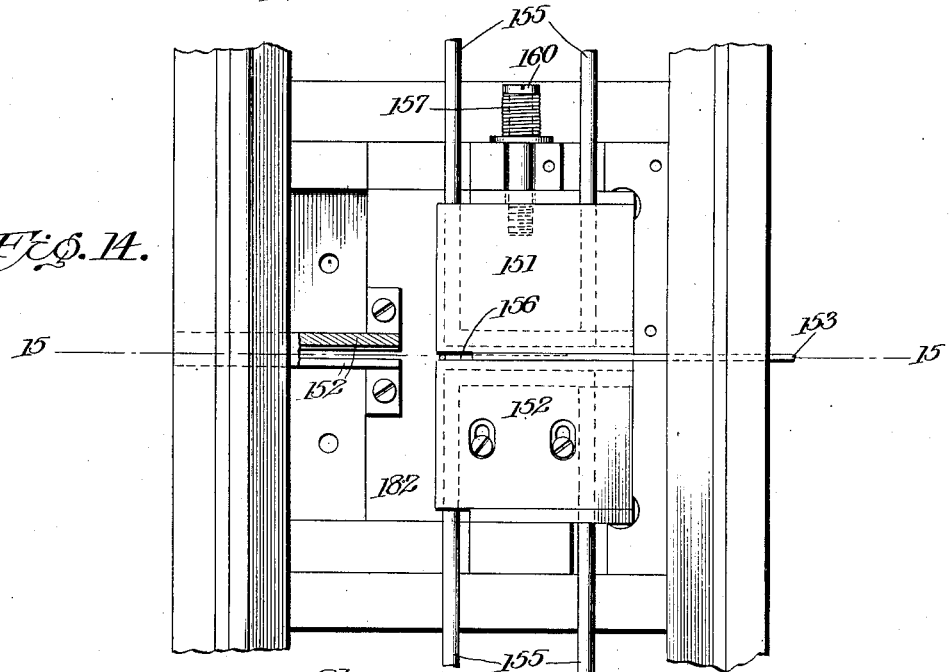
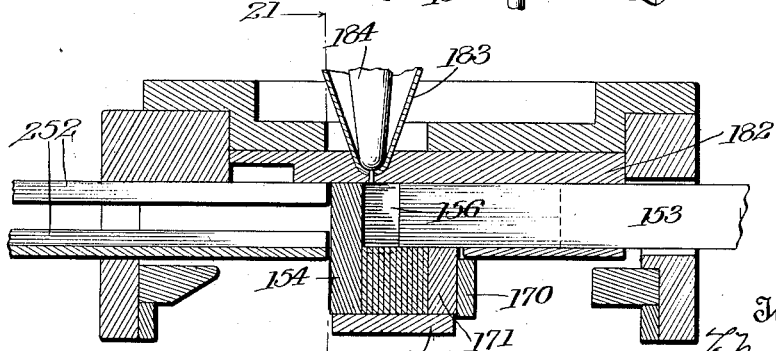

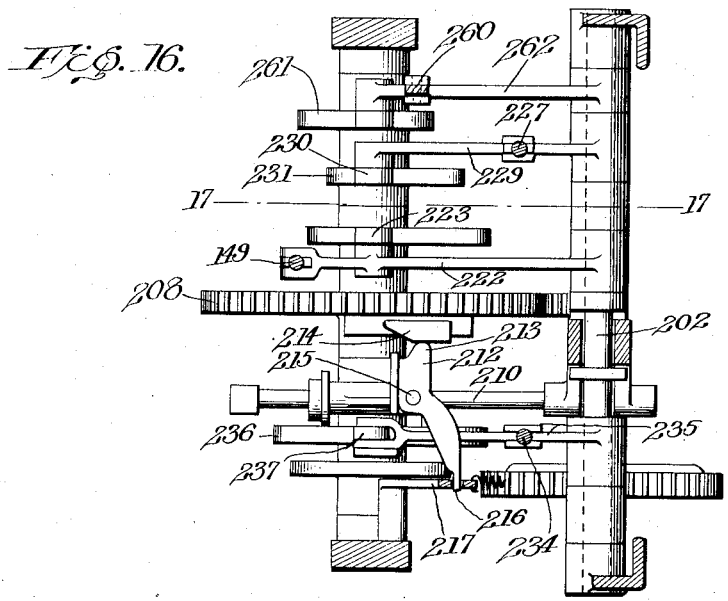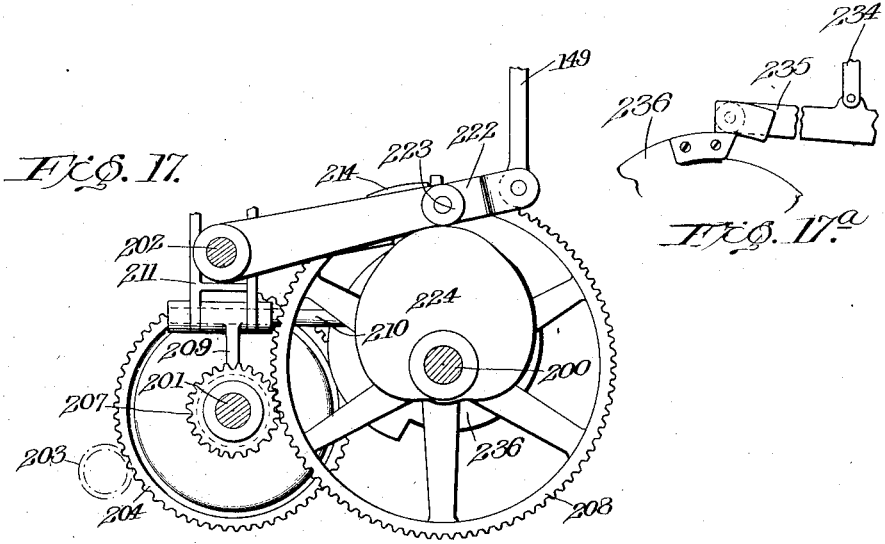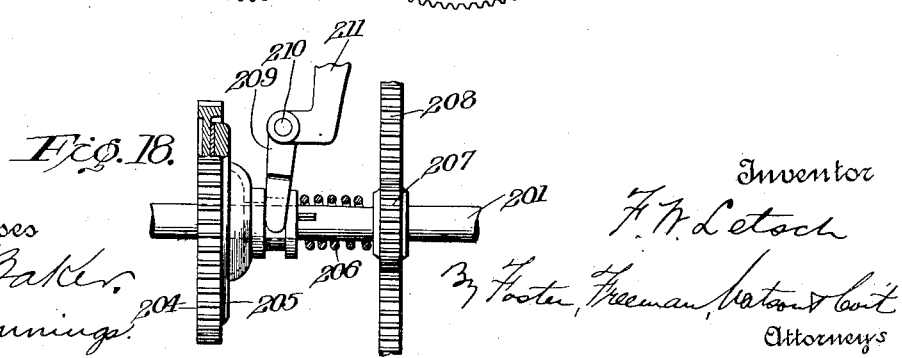

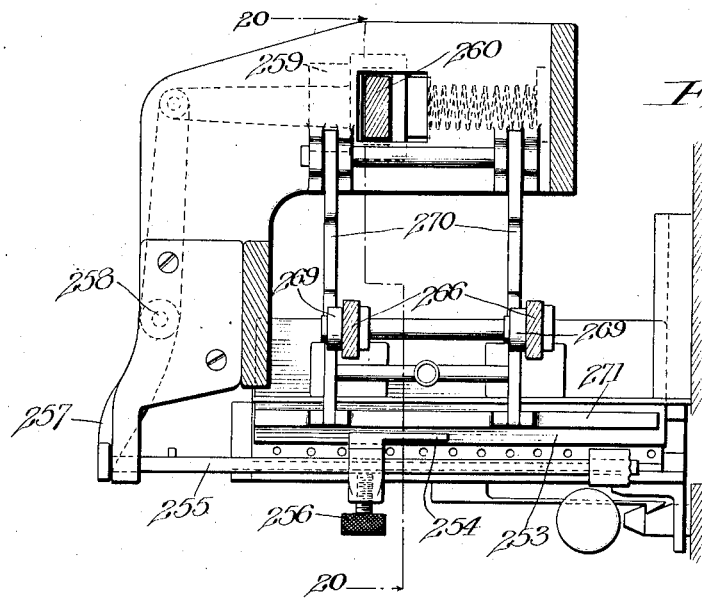
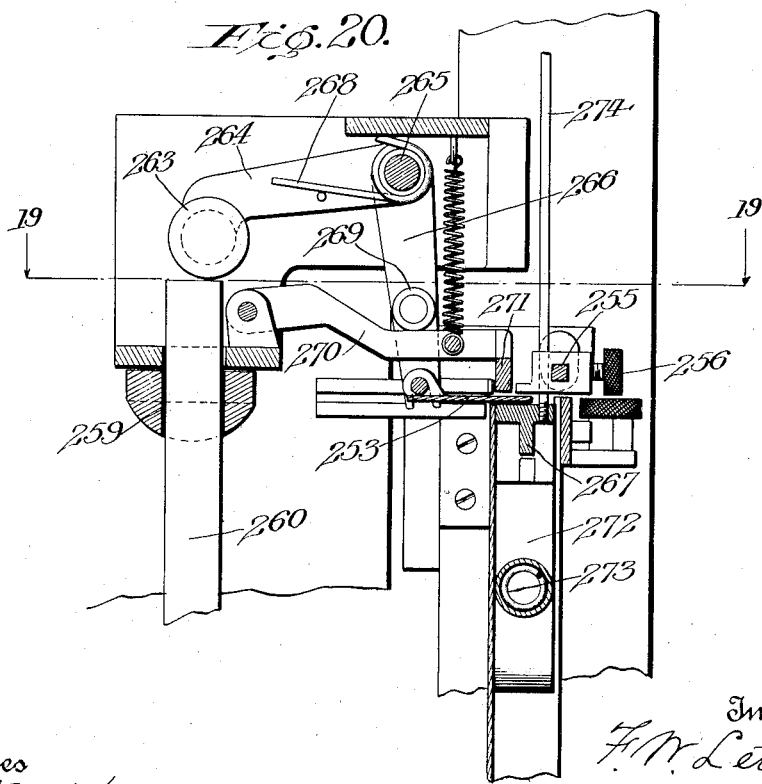

UNITED STATES PATENT OFFICE.

FREDERICK W. LETSCH, OF BALTIMORE, MARYLAND, ASSIGNOR TO J. NORRIS McFARLAND, OF BALTIMORE, MARYLAND.

TYPOGRAPHIC MACHINE.

1,392,018.          Specification of Letters Patent.          Patented Sept. 27, 1921.

Application filed May 22, 1916, Serial No. 99,201. Renewed December 28, 1920. Serial No. 433,741.

*To all whom it may concern:*

Be it known that I, FREDERICK W. LETSCH, a citizen of the United States, and resident of the city of Baltimore, State of Maryland, have invented certain new and useful Improvements in Typographic Machines, of which the following is a specification.

This invention relates to typographic machines and particularly to a machine for composing and casting logotypes. The machine as illustrated and described is particularly adapted for casting slugs or logotypes for tabular work such as railway time tables and stock reports. The mechanism is very simple as compared with composing machines in general for the reason that it is not provided with a justifier and the type have a uniform body width. The principal object of the invention is to produce a typographic machine consisting in few and simple parts which is easily operated and not likely to get out of order, and which is capable of producing satisfactorily the class of work referred to.

The invention will be described in detail in connection with the accompanying drawings, in which:—

Figure 1 is a front view of a logotype machine embodying my invention;

Fig. 2 is a left side elevation of the machine;

Fig. 3 is a right side elevation;

Figs. 3ª and 3ᵇ are details.

Fig. 4 is an enlarged front elevation of the upper portion of the machine, parts being removed and other parts being broken away;

Fig. 4ª is a plan view of the machine.

Figure 21:
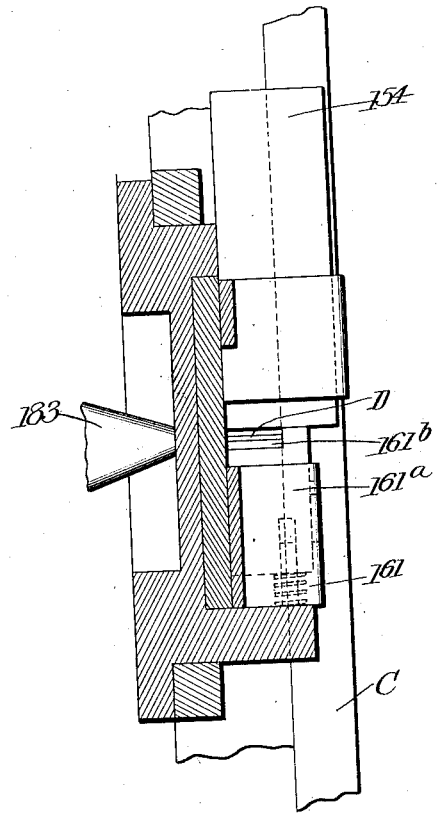
Figure 22:
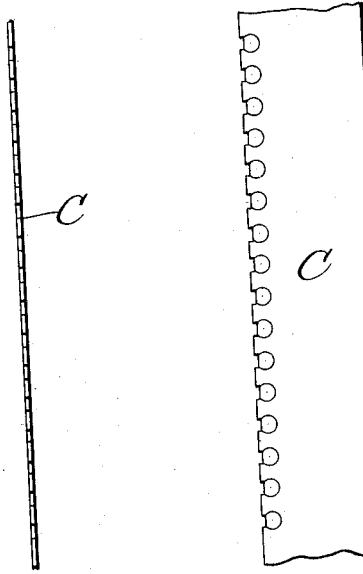
Figure 23:
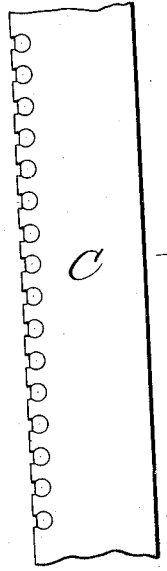

Fig. 5 is a section from the front to rear through the keyboard and the turret which carries the pin plates;

Fig. 5ª is a section on the line 5ª of Fig. 5;

Fig. 6 is a sectional view through the turret on the line 6—6 of Fig. 5, showing the keyboard in plan;

Fig. 7 is a section on the line 7—7 of Fig. 5;

Fig. 8 is a front view of a portion of one of the pin plates;

Fig. 9 is a section on the line 9—9 of Fig. 8;

Fig. 10 is a section on the line 10—10 of Fig. 9;

Fig. 11 is a front elevation of the escapement mechanism showing the keyboard in section on the line 11—11, Fig. 5;

Fig. 12 is a section from front to rear through the melting pot and mold;

Fig. 13 is a section on the line 13—13 of Fig. 4;

Fig. 14 is a front view of the mold and adjacent parts;

Fig. 15 is a section on the line 15—15 of Fig. 14;

Fig. 16 is a plan view of the cam shaft and cam levers;

Fig. 17 is an end view of the same;

Fig. 17ª is a detail of one of the cams;

Fig. 18 is a side view partly in section of a portion of Fig. 17;

Figs. 19 and 20 are sectional views of part of the galley mechanism, Fig. 19 being a plan view looking from the line 19—19 of Fig. 4 and Fig. 20 being a section on the line 20—20 of Fig. 19;

Fig. 21 is a section about on the line 21—21 of Fig. 15;

Figs. 22 and 23 are edge and side views of one of the matrix bars;

Fig. 24 is a view from the rear of the lower end of the matrix frame or elevator and the matrices; and Fig. 25 is a section on the line 25—25 of Fig. 24.

The illustrated mechanism embodying my present invention is mounted in and upon a main frame A of any suitable construction. The working parts of the machine comprise a keyboard B, a series of matrix bars C, a mold D, a melting pot E and a galley F. The keyboard controls the positioning of stop pins in a pin plate and these pins in turn position the matrix bars to bring the desired matrix characters opposite the mold. The line of matrices is then clamped and metal ejected into the mold from the melting pot to cast a logotype against the matrices. The logotype is then ejected from the mold and assembled in its proper position in the galley.

Referring to Figs. 1, 5, 7 and 11, 101 indicates the key levers, each of which has a horizontal arm bearing two keys 102, 103, and a vertical arm 104, the upper end of which engages a pin 105, extending laterally from a pusher 106, the arrangement being such that when a key is depressed the corresponding pusher 106 will be moved forward, for a purpose to be presently explained. On releasing the key the key lever is raised by a spring 107, (Fig. 5) and the pusher 106 is restored to normal position. The rear keys 102 have on them special characters which are usually on the first matrix bar only, such as the characters indicating flag stops, etc., on railway time tables. The keys 103 have on them the respective characters of the remaining matrix bars, which bars usually are duplicates of one another.

As shown in Figs. 5 to 7, inclusive, the pushers 106 are slidably mounted in a post 108 in the rear portion of which are slots 109 through which the pins 105 project to engage with the key lever arms 104.

In the rear of the post 108 (Figs. 5 and 6) there is a vertical shaft 110 to which is connected a turret 111, the turret having a hub 112 mounted on the shaft and the shaft and turret being supported, as shown, by ball bearings 113 resting upon a part of the framework. On opposite sides of the turret are pin plates 114 carrying a number of series of slidable pins 115. These pins are arranged in rows vertically and horizontally. The number of vertical rows corresponds to the number of matrix bars in the machine and the number of horizontal rows corresponds to the number of characters on each matrix bar, hence there is a particular pin for each character of each matrix bar and by selecting and projecting the proper pins any selected characters of the several matrix bars may be brought into line opposite the mold, as will be more fully explained hereinafter.

Each of the pin plates 114 is mounted in guide-ways 116 on the turret. The turret is given a semi-rotation after the pins for a logotype are selected which carries the pin plate with the selected pins from the front to the rear of the turret and brings the previously set pin plate from the rear to the front to have its pins reset for the succeeding logotype. While at the rear of the turret the matrix bars are dropped or moved down into engagement with their respective pins as will be explained later. The pin plate, as shown in detail in Figs. 8, 9 and 10, comprises horizontal bars 117 with vertical strips 118, 119, in front and rear thereof. The strips 118 have spring tongues 120 which frictionally hold the pins 115 in any position to which they may be moved. The strips 118, 119, are set in kerfs in the bars 117. The pin plates are removable and different pin plates suited to different thicknesses of matrix bars and different fonts of type may be used.

Referring to Figs. 5 and 11 each key lever is connected with a short vertically moving slide 121, the upper end of which extends through an opening in a feed bar 122. Each of the slides 121 has an incline 123 which coöperates with an incline 124 on the feed bar to move the feed bar to the left against spring 121$^a$ when the slide 121 is pulled down by its connected key lever. The feed bar 122 carries a pawl 125 which coöperates with the rack 126 on the pin plate 114 which is on the front of the turret 111. Thus as each key lever is operated the pin plate is moved one step to the right by spring 121$^a$ and it is held from reverse movement by the holding pawl 127, the pawls 125, 127 being spring pressed against the rack. The keyboard also comprises a space key 128 mounted on levers 129, the rear ends of which engage slides 130 having inclines at their upper ends which coöperate with the feed bar 122 to move the pin plate. The feed bar is spring-pressed against a stop 122$^a$ which is eccentric and rotatable to adjust the feed to suit different widths of type. The matrix bars are removable, as hereinafter described and different widths of bars may be used with corresponding pin plates and racks or ratchet bars 126. The stop may be secured in any adjustment by screws 122$^b$. Below the feed bar is a release bar 131 which is normally held in the position shown in Fig. 11 by an elbow lever 132 and against the tension of a spring 133, the elbow lever being held in the position shown by a projection 134 on the starting lever 135. When the starting lever is moved the elbow lever 132 is released and the spring draws the release bar to the left causing an inclined cam slot 136 on the release bar to move a pin 137 downward, this pin being carried by a slide 138 which has fingers 139 overlying the pawls 125, 127. When the starting key is operated, therefore, the pawls are withdrawn and the rack 126 released and immediately the pin plate 114 is returned to its normal position on the turret by a spring 140 (Fig. 11).

The turret shaft 110 is turned by a bevel pinion 141 in mesh with a bevel gear 142 mounted on a shaft 143. The starting lever 135 is loosely pivoted on shaft 143 and it carries a pawl 144 which engages ratchet teeth on gear 142. When the starting lever is pushed to the rear it immediately frees the rack 126 and permits the pin plate to return to its normal position and then turns the gear 142 sufficiently to move the turret through 180°. As shown in Fig. 5$^a$ the pins 115 are quite narrow and each pusher 106 is provided with a narrow projection 106$^a$ to coöperate with the pins.

As shown in Figs. 1, 2, 4$^a$ and 6, the turret has diagrammatically opposite notches 144$^a$ which are engaged by a roller 144$^b$ carried by a spring pressed arm 144$^c$ to lock the turret in either of its operative positions. The roller 144$^b$ also serves to return the pins to their normal position in the pin plate as the pin plate is rotated from rear to front position.

Matrix bars and casting mechanism.

Each of the matrix bars C, except that bearing the special characters, is provided on its rear face with as many regular characters as it may be desired to produce on the machine, these characters being spaced apart to correspond with the spacing of the pins in the vertical rows of the pin plate and having a uniform body width. The matrix bars are normally sustained in the machine with their lower ends above the pin plate 114, as shown in Fig. 12. The bars have recesses 145 and a pivoted latch 146 lies normally in the recesses and limits the upward and downward movement of the bars, (Figs. 4, 4$^a$, 12 and 13). On withdrawing the latch the bars may be lifted from the machine. The matrix elevator 147 consists in two side bars running in suitably fixed guides 147$^a$, a cross bar 148 at the bottom to which an operating link 149 is connected and a cross head 150 at the upper end. The latch 146 which sustains the matrix bars is removably pivoted on the cross head 150.

In the rear of the matrix bars and above the turret 114 the mold D is located. Referring to Figs. 12, 14 and 15, the mold comprises an upper mold block 151, a lower mold block 152, a body piece 153 and an end-gate 154. The mold blocks are preferably water-cooled by means of channels which are indicated in dotted lines in Fig. 14, the water being circulated through pipes 155. The upper mold block has a very slight vertical movement sufficient to relieve the body piece when it is necessary to eject the logotype from the mold cavity 156 and to clamp the body base securely when casting is taking place. A spring 157 holds the upper mold block in its elevated position, relieving the body piece and when the casting is to take place the mold block is forced down upon the body piece by contact of the spring plunger 159 (Fig. 4) on the cross-head of the matrix elevator with the stud 160 projecting upward from the mold block 151 (Fig. 12).

The end-gate 154, as shown in Figs. 4 and 15, closes the left end of the mold cavity and also serves as a clamp for the matrix bars. The end-gate is normally raised into the position shown in Fig. 4 with its lower end just above the mold opening by a spring 161 which operates to lift a short slide 161$^a$ upon which the end-gate rests (Fig. 21). The slide 161$^a$ is recessed at 161$^b$ to permit the passage of logotypes from the mold D. When the matrix bars are lowered a spring plunger 162 on the cross-head 150 engages the end-gate and moves it down to close the mold. Immediately thereafter a spring plunger 163 (Fig. 4) on the cross-head contacts with a toggle 164 which seats the end-gate firmly upon the mold blocks. Simultaneously a cam or incline 165 on the mold elevator (Fig. 4) engages a roller 166 on a pivoted arm 167. This arm carries a spring 168 which presses against the free end of the pivoted arm 169 carrying a shoe 170. The shoe is thus moved against the matrix bars and clamps them securely against the end-gate during the casting operation. As shown in Fig. 4, thin matrix bars carrying small type are used and the maximum space for matrix bars is filled out with a block 171 which is pivotally hung on the pins 171$^a$. When using thicker matrix bars with larger letters the filling block 171 is removed and a thinner block used.

As the matrix elevator descends a cam or incline 172 (Figs. 2 and 12) engages a roller 173 on a pivoted arm 174 and forces the arm forward. Through an intermediate spring 175 movement is imparted to a pivoted arm 176 which carries a shoe 177, bearing on the front edges of the matrix bars. In this way the matrix bars are automatically pressed against the mold during the casting operation. It will be understood that when the matrix elevator starts upward after casting, the body piece, end-gate and matrix bars are immediately released and the end-gate 154 permitted to rise until its lower end is above the level of the mold cavity, as shown in Fig. 21.

During the latter part of the upward movement of the matrices and the greater part of the downward movement they are held away from the mold by a shoe 178 (Fig. 13) which is carried by a lever 179, pivoted on the matrix elevator and having a roller 180 which travels on one edge of the fixed frame of the matrix elevator. As shown in Fig. 2, the roller 180 drops into a recess 181 on the elevator frame when the elevator is in its lower position, thus releasing the matrices from the shoe 178, and permitting them to be moved against the mold. Referring to Figs. 4, 12, 24 and 25, 179$^a$ indicates a shoe arranged to be moved toward and from the faces of the matrix bars by an arm 180$^a$ of a rock shaft 181$^a$ journaled in fixed brackets. A second arm 182$^a$ of the rock shaft carries a roller 183$^a$ which travels on a rail or rib 184$^a$ on the lower end of the matrix elevator. The rail 184$^a$ terminates in an incline 185$^a$. When the elevator descends to bring the selected matrices to the mold the roller 183$^a$ runs off the rail 184$^a$, permitting the matrices to be forced against the mold by the shoe 177. After a slug is cast the elevator starts upward and before it begins to lift the matrices roller 173 runs off of incline 172, relieving the pressure of the matrices against the mold and the inclines at 181 (Fig. 2) and 185$^a$ (Fig. 25) engage the rollers 180 and 183$^a$ respectively, and throw the shoes 178 and 179$^a$ against the faces of the matrix bars, thus pushing the matrices off the newly cast type so that the matrix bars may be elevated without injuring the type.

While the matrix bars are locked against the mold type metal is injected into the mold from the rear through an opening in the plate 182 which forms the back of the mold. Referring to Figs. 2, 3, 12 and 15, the melting pot E is provided with a nipple 183, which is seated in a recess in the plate 182. The opening in the nipple is normally closed by a choker 184 which is withdrawn momentarily during each casting operation. The choker is operated by a lever 185 pivoted at 186 to a part of the melting pot. The upper end of this lever carries a roller 187 which is pushed forward by the inclined face of a lever 188 pivoted on an arm 189. The lever is normally held in the position shown in Fig. 12 by a spring 190. During each casting operation the arm 189 descends, the inclined face of lever 188 moves the roller to the right rocking lever 185 and withdrawing the choker. As soon as the lever 188 passes the roller, the choker is closed by the action of spring 191 which is connected to the upper end of lever 185. The arm 189 rises without operating the choker lever, the spring 190 permitting the lever 188 to pass the roller 187.

Referring to Fig. 12, 190$^a$ indicates a chamber below the pump cylinder and communicating therewith. When the piston rises the molten type metal is drawn into this chamber through the channel 191$^a$, the choker 184 at this time being in its forward position. The choker moves rearward before the casting operation, closing the inlet channel 191$^a$ and opening the orifice in the nipple through which the metal is injected into the mold. As the pump moves downward the metal is forced through the channel 192$^a$, shown in dotted lines in Fig. 12, into the nipple and mold and immediately thereafter the choker is moved forward by the spring 191, closing the nipple and retaining the metal in the mold. The channel 191$^a$ being uncovered by the forward movement of the choker, permits excess metal to escape freely into the melting pot as the pump piston comes to rest, thus preventing any undue strain on the pump or the nipple and choker. The choker thus performs the double function of choker and pump valve.

While the choker is withdrawn from the nipple opening the pump is actuated to inject the requisite amount of metal into the mold. Referring to Fig. 12, 192 indicates the pump barrel and 193 indicates the pump plunger, which is shown in dotted lines. The pump plunger is connected to a vertical rod 194 and a spring 195 surrounding the rod holds the pump plunger under tension to move downward. The tension of the spring may be varied by means of an adjusting screw 196 (Fig. 12) and which is threaded into a part of the frame and the lower end of the spring bears on a collar 197 which is fast on the pump rod 194. The rod is raised and lowered at the proper time by means of the cams and levers which will be presently described.

Referring to Figs. 2, 3, 16, 17 and 18, 200 indicates a cam shaft, 201 a clutch shaft, and 202 a rod mounted in the lower part of the frame upon which the cam arms hereinafter refererd to are pivoted. The clutch shaft is driven from any source of power through, for instance, the pinion 203 and gear 204. As shown, the gear 204 is loose on the shaft and constitutes one clutch member, the other clutch member 205 (Fig. 18) is arranged to slide on and turn with the shaft 201 and when these members are held together by the spring 206 the shaft 200 is driven through pinion 207 and gear 208. The clutch is controlled by an arm 209 of the shaft or rod 210, mounted in brackets 211 (Figs. 3, 16 and 17). On an arm of the shaft 210 is mounted a lever 212, a rounded end of which 213, is adapted to be engaged by a cam projection 214 which is mounted on the cam shaft and which, as shown, is connected to the gear 208 which drives the cam shaft. The lever 212 is pivoted at 215 and its opposite end 216 engages a lever 217 (Figs. 3 and 16). To the starting lever 135 is connected a link 218, the free end of which is hooked, as shown in Fig. 3$^a$ and adapted to engage the lever 217 and rock it forward as the starting lever is returned to normal position. The hook of link 218 is thrown over a suitable projection 217$^a$ (Fig. 3$^b$) on lever 217 by means of a cam 219 which rides on a fixed projection 220 on the frame to carry the hook into engagement with arm 217. As arm 217 is thus rocked forward it rocks lever 212 about the pivot 215, thus freeing said lever from the cam 214 and permitting the shaft 210 to rock sufficiently to throw the clutch members into engagement under pressure of the spring 206. A very slight movement of the cam is sufficient. As a result the cam shaft is rotated until cam 214 engages the lever 212 and rocks the shaft 210, throwing the clutch members out of engagement. In this manner the cam shaft is given one complete revolution each time the starting lever 135 is operated. In some cases it is desirable to cast a number of duplicate slugs from the same matrices, in which case the lever 217 is thrown forward by hand and locked by means of the hook 221 engaging pin 221$^a$ on the lever, thus holding the clutch members in continuous engagement (Fig. 3).

The matrix elevator is raised and lowered by the link 149 (Figs. 4 and 17) which is connected to arm 222 pivoted on rod 202. Arm 222 carries a roller 223 resting on the elevator cam 224 on shaft 200 (Figs. 16 and 17).

The choker arm 189 is pivoted on rod 225 (Figs. 2 and 12) and is rigidly connected to a shorter arm 226 to the free end of which is connected a vertical rod 227. A spring 228 normally presses this rod downward and the lower end of the rod is connected to a cam arm 229 which carries a roller 230 resting on the choker cam 231 on shaft 200.

The pump rod 194 is connected to an arm 232 pivoted on rod 225 and rigidly connected with this arm is a shorter arm 233 to the free end of which is pivotally connected a vertical rod 234, the lower end of which is connected to a cam arm 235 (Figs. 3 and 16). Arm 235 is operated by cam 236 on shaft 200, which cam is spiral and gradually raises the roller 237 connected with the arm. At one point in the cam there is a sudden drop, indicated at 238 and as the cam is designed to give the pump a very quick movement and the roller would not run off of the shoulder 238 with sufficient rapidity, a block 239 is provided on the side of the cam and a shoe 240 is provided on the lever 235 to coöperate with the block. It will be understood that as the cam turns in the direction of the arrow (Fig. 3) the roller first frees itself from the high point of the cam but the arm 235 is prevented from dropping by the shoe 240. A moment later the shoe drops off of the high point of the cam at the shoulder 238 permitting the pump spring to give the pump plunger a very quick movement, at the proper moment, which drives the type metal into the mold.

A body piece 153 serves to eject the cast slug for logotype from the mold and for this purpose it is connected with an ejector slide 241 (Fig. 4). This slide is operated by an arm 242 which is pivoted at 247 to a yoke 246, which yoke is pivoted to the main frame at 243. The yoke 246 has a downwardly extending arm or cam lever 244 which is operated by a side cam 245 on the cam shaft 200 (Figs. 1 and 3). The arms of yoke 246 lie on opposite sides of the ejector lever 242. On one of the arms of the yoke 246 is a spring casing 248 carrying a heavy spring which operates through a plunger 249 to press the arm 242 against the other branch of the yoke 246. When the cam lever 244 is operated, the spring pressed plunger 249 operates the arm 242 yieldingly, that is, if the arm ejector slide should stick, the arm 242 can yield notwithstanding the continued movement of the cam lever 244. The yoke 246 is under tension to move to the right (Fig. 4) under the influence of a spring 250. The ejector slide 241 normally stands against an adjusting screw 251 which regulates the rearward movement of the slide and thus regulates the length of the mold opening. The ejector slide is moved periodically to eject the slugs or logotypes from the mold into the galley, the construction of which will now be described.

As previously described a logotype or slug is ejected from the mold after each casting operation. Referring to Figs. 4, 19 and 20, the slugs are pushed through a guide 252 onto a plate 253 which projects from the rear into the galley F by means to be presently described. As the slugs are assembled on the plate 253, the foremost slug eventually comes in contact with a finger 254 which is adjustably secured on a slide 255 for different lengths of lines by means of a screw 256. When the last slug of a line is pushed into the galley the foremost slug moves the finger 254 and the slide 255 to the left, rocking a lever 257 which is pivoted at 258. To the rear end of this lever is connected a yoke 259 which loosely encircles a slide 260. The slide 260 is moved upward at each revolution of the cam shaft 200 by the cam 261 which operates cam lever 262 upon which slide 260 is sustained. Normally the slide 260 moves up and down without effect but when the line is full and the lever 257 is rocked the slide 260 is moved under a roller 263, the roller being carried on an arm 264 (Figs. 4 and 20). The arm 264 is fast on the shaft 265 and this shaft carries two arms 266 which engage the slide 253 and draw it rearward when the arm 264 is raised thus dropping the line of slugs onto the galley rest 267. The plate or slide 253 is returned when the slide 260 drops by means of a spring 268. A roller 269 on the arm 266 operates to depress a lever 270 immediately after the slide 253 is withdrawn from the galley and a bar 271 on the free end of the lever coöperates with the line of type to depress the type when they are relieved from the support of the plate or slide 253. The galley rest 267 is sustained by two shoes 272 which frictionally engage the flanges of the galley and are pressed against the galley by a spring 273. The bar 271 presses the line of slugs last cast down below the plane of the slide 253 so that said slide can immediately return to receive the next line. The galley rest 267 has a number of holes, indicated by dotted lines, into any one of which a rod 274 may be inserted (Figs. 4, 19 and 20). This rod forms the left hand guide or stop for the column of slugs and it is adjustable for different widths of columns, the adjustment conforming to the position of the finger 254.

As shown, particularly in Fig. 4, the logotypes or slugs L are pushed into the guide 252 by the body piece 153. To the left and below the mold a lever 275 is pivoted at 276. The right side of the lower end of the lever is concaved and the upper and lower portions of the concave edge are engaged by a pin 277 on the matrix elevator, positively rocking the upper arm of the lever to the right when the elevator descends and positively rocking it to the left when the elevator ascends. A spring 278 tends to move the upper arm of the lever constantly to the right against the pin 277. On the upper end of the lever 275 is a pivoted finger 279 yieldingly held in line with the lever by a spring 280.

The operation of the transfer lever 275 is as follows: When the matrix elevator is in its lowest position, the casting of a slug or logotype takes place. At this time the finger 279 is in the vicinity of the mold and below the guide 252 as shown in Fig. 15. The guide 252 consists of front and rear rails as shown in Figs. 4, 14 and 15 between which the finger 279 travels. The slug or logotype is left on the guide near the mold by the body piece and when the elevator rises the pin 277 moves the lever arm 275 to the left, the finger 279 carrying the slug or logotype into the galley to be assembled into a line and column as previously described.

The operation of the machine will probably be fully understood from the foregoing description but it may be briefly recapitulated as follows: There are as many type bars C as the number of letters in the largest logotype which it is desired to produce in the machine for any given work. By opening the latch 146 the type bars can be removed and replaced or their number increased or diminished.

The keys for a given logotype are operated in succession and corresponding pins projected forwardly in one of the pin plates, one pin for each character in the logotype, the pin plate being stepped along so that but one pin is projected from each vertical row. After the pins are projected the turret is turned through 180° to bring the pin plate to the rear with the projected pins under their respective type bars (Fig. 5). The type bars are then lowered until they are stopped by their respective pins which brings the selected characters on the type bars opposite the mold. The mold opening is set for the desired length of logotype and the mold parts are clamped, the type bars being clamped against the face of the mold. The choker is then withdrawn and the pump operated to drive the molten metal from the melting pot into the mold. The choker then closes the mold orifice.

The end-gate 154 then rises, the type bars are moved away from the face of the mold, and the body piece 153 then ejects the logotype from the mold onto the guide-ways 252. The logotype is then transferred to the galley by the finger 279 (Fig. 4). The logotypes are assembled in lines and columns in the galley as described in the specification.

Having described my invention what I claim and desire to secure by Letters Patent is:

1. In a typographic machine, the combination with a composing mechanism, of a turret, a pin plate on the turret having pins adapted to be projected by the composing mechanism and matrix bars adapted to be positioned by the pins in the pin plate, the turret being rotatable to carry the pin plate from the composing position to the matrix bars.

2. In a typographic machine, a rotatable turret, a plurality of pin plates carried by said turret, a composing mechanism adapted to set pins in the pin plates, and matrix bars adapted to be positioned by said pins, the turret being rotatable to carry the set pins from the composing position to the position in which they coöperate with the matrix bars.

3. In a typographic machine, the combination with a rotatable turret, a series of movable pins, and means on the turret for sustaining the movable pins of a composing mechanism comprising a key board in front of the turret and pushers within the turret operated from the key board for moving the pins radially outward.

4. In a typographic machine, the combination with a rotatable turret, a series of movable pins, and means on the turret for sustaining the movable pins of a composing mechanism comprising a key board in front of the turret and pushers within the turret operated from the key board for moving the pins radially outward, said turret being rotatable to carry the set pins from the composing position to a matrix assembling position, and matrix bars at the latter position adapted to coöperate with projected pins to bring selected characters into line.

5. In a typographic machine, the combination with a composing mechanism, of a turret, a pin plate on the turret having pins adapted to be projected by the composing mechanism, means for feeding the pin plate relatively to the turret during the composing operation, and matrix bars adapted to be positioned by the projected pins in the pin plate, the turret being rotatable to carry the pin plate from the composing position to the matrix bars.

6. In a typographic machine, the combination with a composing mechanism, of a turret, a plurality of pin plates arranged in different positions on the turret and movable relatively to the turret, said pin plates having pins adapted to be projected by the composing mechanism, and matrix bars adapted to be positioned by the projected pins in the pin plates, the turret being rotatable to carry the pin plates successively from the composing position to the matrix bars.

7. In a typographic machine, the combination with a rotatable turret, of diametrically opposite pin plates mounted on the turret, said pin plates being movable step by step in guides relatively to the turret, a composing mechanism arranged to project pins of either pin plate when in the composing position, means for turning the turret through 180° to carry the pin plates successively from the composing position to the matrix bars, and a series of matrix bars adapted to be positioned by the projected pins of either pin plate.

8. In a typographic machine, the combination with a composing mechanism, of a rotatable turret, two pin plates mounted on the turret in diametrically opposite positions, means for turning the turret intermittently through steps of 180° to carry the pin plates from front to rear and vice versa, a plurality of matrix bars at the rear of the turret and adapted to be limited in their movements by projected pins in the pin plates, the composing mechanism being arranged to project pins when the pin plates are in front of the turret.

9. In a typographic machine, the combination with a composing mechanism, of a turret, a pin plate on the turret having pins adapted to be projected by the composing mechanism, matrix bars adjacent the turret and adapted to be positioned by the pins in the pin plate, means for rotating the turret to bring the pin plate alternately to the composing position and to the matrix bars, and means for returning the projected pins to normal position as the pin plate is moving toward the composing position.

10. In a typographic machine, the combination with a composing mechanism, of a turret rotatable on a vertical axis, guideways arranged tangentially on the turret, a pin plate sliding in said guideways, said composing mechanism comprising a key board and connections operated by the keys for projecting pins in successive rows and for feeding the pin plate step by step to bring successive rows opposite the projecting mechanism.

11. In a typographic machine, the combination with a rotatable turret, of a composing mechanism in front of the turret, a series of matrix bars in the rear of the turret, a pin plate mounted on the turret and provided with movable pins to represent characters, means for moving the turret to carry the pin plate from the composing mechanism to the matrix bars, and stop devices for yieldingly holding the turret with the pin plate in either position.

12. In a typographic machine, the combination with a rotatable turret, of a composing mechanism in front of the turret, a series of matrix bars in the rear of the turret, a pin plate mounted on the turret and provided with movable pins to represent characters, means for moving the turret to carry the pin plate from the composing mechanism to the matrix bars, stop devices for yieldingly holding the turret with the pin plate in either position, and means for moving the pin plate step by step relatively to the turret when operated on by the composing mechanism.

13. In a typographic machine, the combination with a turret rotatable about a vertical axis, of a pin plate on the turret, a composing mechanism in front of the turret, matrix bars in the rear of the turret, means for moving the turret to carry the pin plate from the composing mechanism to the matrix bars, means for moving the matrix bars into coöperation with projected pins to bring selected matrices into line, and a casting mechanism adapted to cast a slug from said selected matrices.

14. In a typographic machine, the combination with a mold, of a series of matrix bars, means for raising the matrix bars to normal position after each operation, means for ejecting a slug from the mold after each casting operation, and a device operated automatically by the means for raising the matrix bars, said device being adapted to move the slug from the mold to the galley.

15. In a typographic machine, the combination with matrix bars, a mold, and casting mechanism, of an arm movable to and from the mold, and means for moving the matrix bars from casting to normal position, said means being arranged to automatically operate said arm to move a slug from the mold to the galley.

16. In a typographic machine, the combination with a mold, of a series of matrix bars, a vertically movable frame on which said bars are normally suspended, means for variably limiting the downward movement of the bars when the frame is moved down to bring selected characters into register with the mold, means for clamping said matrix bars together and against the mold during the casting operation, and a cam on the frame for operating said clamping means.

17. In a typographic machine, the combination of a mold, an end gate for the mold, a series of matrix bars, a vertically movable frame on which said matrix bars are normally suspended, a vertically movable end gate for closing the mold, a spring device normally holding said end gate above the mold, and a second spring device carried by said frame and adapted to depress the end gate and close the mold during the casting operation.

18. In a typographic machine, a bar having one series of characters, a second bar having a different series of characters, and a key lever bearing two characters, one selected from each bar, and means controlled by the key lever for selecting characters from each bar.

19. In a typographic machine, the combination with two bars each bearing a series of characters, the characters of one differing from those of the other, key levers and connections controlled by the key levers for selecting any character of either bar, each key lever bearing two keys representing corresponding characters of the two bars.

20. In a typographic machine, the combination of a plurality of bars, one of said bars bearing a plurality of characters and the remaining bars being alike and each bearing a plurality of characters unlike the characters on the first mentioned bar with a movable pin plate bearing rows of movable pins, of key levers and connections for projecting the pins, each key lever bearing two keys, for the purpose set forth.

21. In a typographic machine, the combination of a plurality of bars, one of said bars bearing a plurality of characters and the remaining bars being alike and each bearing a plurality of characters unlike the characters on the first mentioned bar, a series of key levers each bearing two keys corresponding respectively to the two different kinds of bars, and means operated by the key lever for controlling all of the bars.

22. In a typographic machine, the combination with a vertically movable slide or elevator, of a plurality of matrix bars carried thereby, a mold, means for moving the elevator to carry the bars to and from the mold, and means controlled by the movement of the elevator to clamp the matrices against the mold and to move the matrices in the opposite direction after the casting operation to free them from the faces of the cast type.

23. In a typographic machine, the combination with a matrix slide or elevator, of a series of elongated matrix bars carried by the elevator each bar carrying a set or font of characters, and means for removably connecting the bars with the elevator so that they may be readily removed and replaced.

24. In a typographic machine, the combination with a matrix elevator, of a series of elongated matrix bars suspended in the elevator each of said bars carrying a set or font of characters, and a latch for removably securing said bars in the elevator.

25. In a typographic machine, the combination with a matrix elevator, of a series of elongated matrix bars suspended in the elevator each of said bars carrying a set or font of characters, and a latch for removably securing said bars in the elevator, the bars having shoulders normally resting on said latch.

26. In a typographic machine, the combination with key levers, of removable and interchangeable matrix bars, a laterally movable pin plate having pins adapted to be projected by the key levers and to limit the assembling movement of the matrix bars, means controlled by the key levers for moving the pin plate laterally, and means for variably limiting said lateral movement, for different pin plates.

27. In a typographic machine, the combination with removable and interchangeable bars, each bearing a plurality of characters of removable and interchangeable pin plates, a key board, and means controlled by the key board for moving the pin plates step by step, and means for changing the feed movement of the pin plates, for the purpose set forth.

In testimony whereof I affix my signature.

FREDERICK W. LETSCH.